(12) United States Patent
Smith

(10) Patent No.: US 9,681,519 B2
(45) Date of Patent: Jun. 13, 2017

(54) NIGHT LIGHT FOR REDUCING NIGHTTIME FEARS

(71) Applicant: Roger S. Smith, Ogden, UT (US)

(72) Inventor: Roger S. Smith, Ogden, UT (US)

( * ) Notice: Subject to any disclaimer, the term of this patent is extended or adjusted under 35 U.S.C. 154(b) by 331 days.

(21) Appl. No.: 14/559,686

(22) Filed: Dec. 3, 2014

(65) Prior Publication Data

US 2016/0165701 A1 Jun. 9, 2016

(51) Int. Cl.
*H05B 37/02* (2006.01)

(52) U.S. Cl.
CPC ..... *H05B 37/0218* (2013.01); *H05B 37/0272* (2013.01); *Y02B 20/46* (2013.01)

(58) Field of Classification Search
CPC  H05B 37/02; H05B 37/0218; H05B 37/0245; H05B 37/0272; H05B 33/08; Y02B 20/46
USPC ................... 315/129, 291, 307, 308
See application file for complete search history.

(56) References Cited

U.S. PATENT DOCUMENTS

| | | | |
|---|---|---|---|
| 5,307,051 A * | 4/1994 | Sedlmayr | ............... A63H 3/001 340/540 |
| 6,894,434 B1 * | 5/2005 | Kosoff | .................. A61M 21/02 315/134 |

* cited by examiner

*Primary Examiner* — Jimmy Vu
(74) *Attorney, Agent, or Firm* — David E. Lovejoy

(57) ABSTRACT

Disclosed is a fear-reducing device including a light for providing illumination in a dark room occupied by a person and including a controller for controlling the light output levels of the light. The light has variable lumen output levels in response to light control signals from the controller for helping overcome night-fear of the person. The control unit automatically reduces the output levels over a tapering period of time extending for multiple weeks. The control unit automatically reduces the output levels over a dimming period for each day of the tapering period. The controller is remote from the light and communicates with the light with wireless communication.

20 Claims, 8 Drawing Sheets

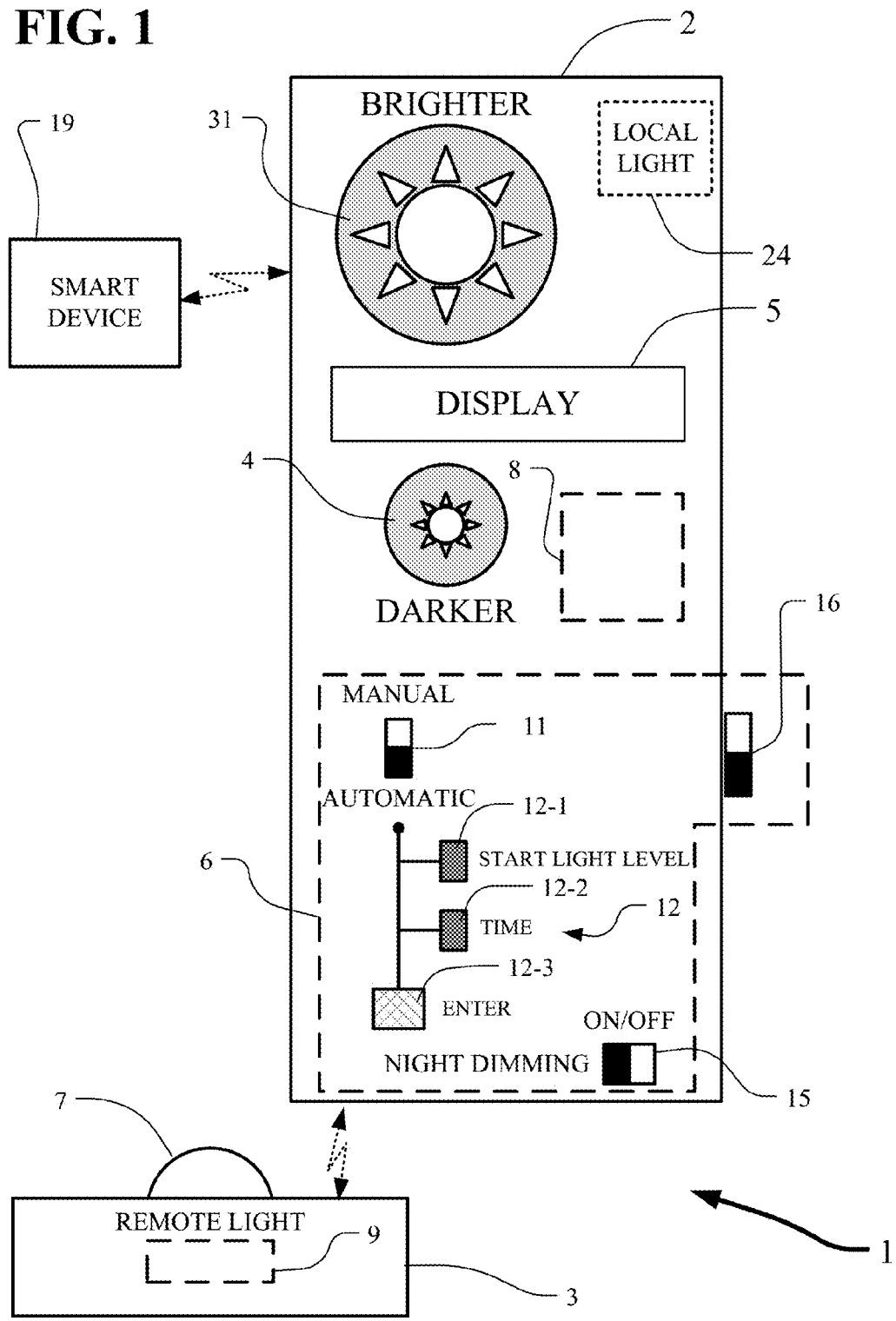

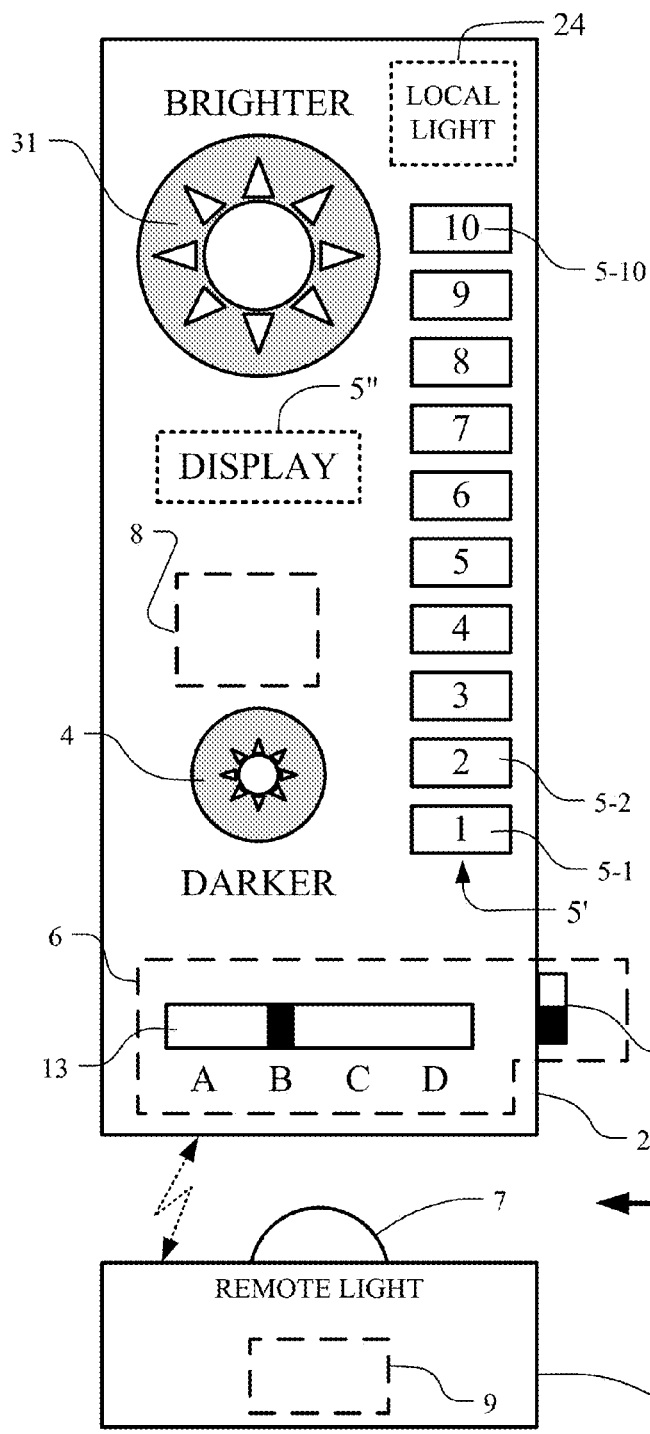
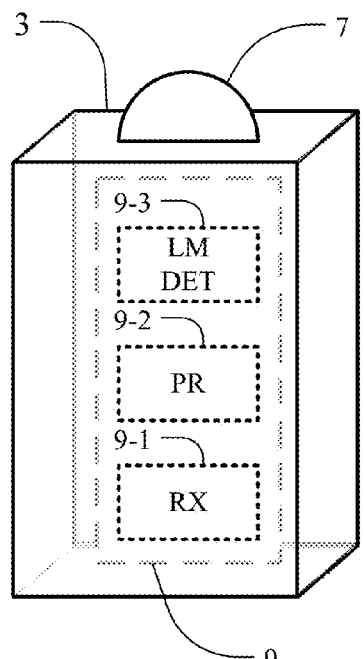

FIG. 10
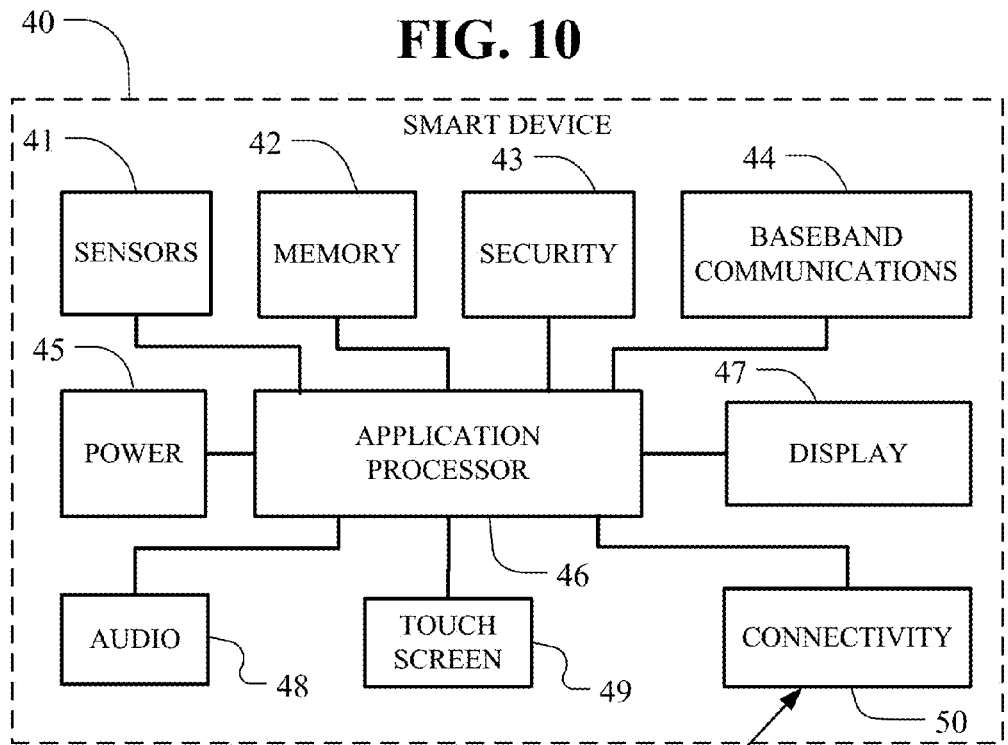
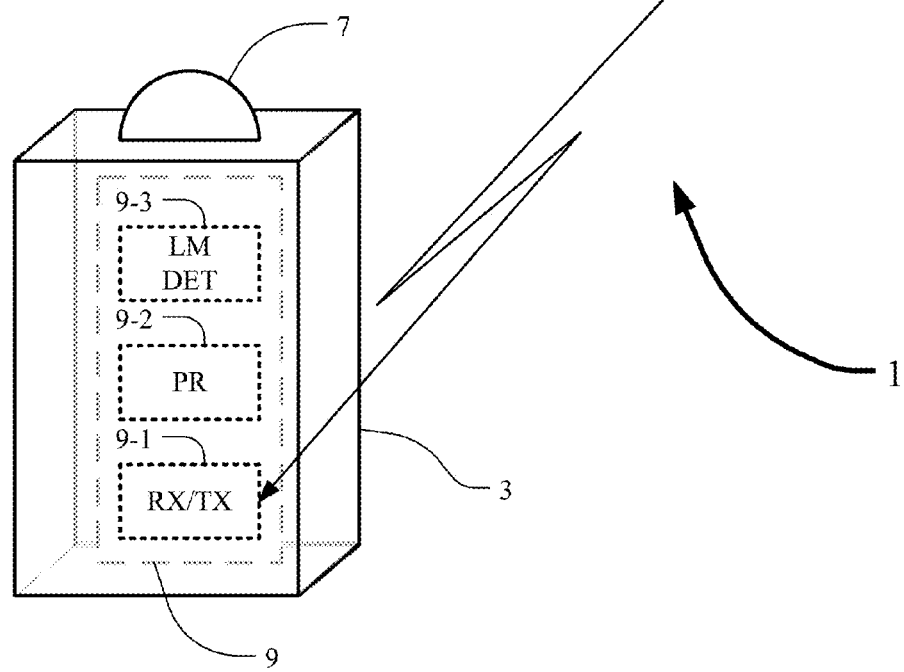

NIGHT LIGHT FOR REDUCING NIGHTTIME FEARS

BACKGROUND OF THE INVENTION

This invention relates to reducing nighttime fears and more particularly to a night light for reducing nighttime fears.

Surprisingly, most children have nighttime fears but most parents don't know it. Nighttime fears cause chronic childhood pain and discomfort, or at their worst, effect learning, health and even brain development. The good thing is that help is both available and very successful. "Fear" is defined as a feeling of dread, anxiety, or profound worry that is triggered by danger and is often accompanied by the urge to hide, fight or escape. "Nighttime fears" are those fears that tend to be associated with the night, darkness, at bedtime or throughout the times a person would typically be sleeping. All children experience fear during childhood including fear of the dark, monsters, and strangers. These fears are considered to be a normal part of child development as long as they are temporary and in proportion to the threat or danger. They are often related to the age of the child (NCS/Harvard 2010[1]). The term "fear" is used in this specification as is commonly defined and includes a psychologic or physical discomfort or anxiety that consciously or unconsciously effects a person.

In younger children, nighttime fears often include fear of the dark, and fear of monsters. Most professionals believe this is related to the developmental stage the child is going through. During this time, the brain is building its ability for imagination, magical thinking and fantasy. Older children tend to have more realistic nighttime fears such as fear of intruders because their brains are developing reality-based thought processes. Just like all child development, fears are not set in stone and there are often transition periods.

Sometimes childhood development is delayed, gets stuck, regresses or several things happen at the same time. For example, research has shown that children with nighttime fear, ages 4-6, demonstrated more fantasy-reality confusion, and their fear was worse if they were less able to differentiate reality from fantasy, compared to children without significant nighttime fears. (Zisenwine 2013).

In addition to changing over time, nighttime fears can be blended together and are therefore sometimes difficult to specify. Fear of the dark may include fear of the unknown, fear of separation, fear of monsters or ghosts, fear of intruders, or fear of injury. They may also be connected to daytime stress, worry, school problems or anxiety related issues (Gregory and Eley 2005[3]).

Although scientists have written about childhood nighttime fears for over 100 years (Charles Darwin 1877[4]), little progress has been made in the areas of raising awareness and providing sound, easy to access treatment until the past few years when researchers have demonstrated significant proven success (Carillo 2005[5]; Gordon 2007,[6] 2007; Muris 2001[7]).

As with many encounters in life, children are taught to be respectful and cautious of the things not understood. Children need to be cautious in the dark, but they do not need to suffer nightly discomfort or future health consequences from night fears.

In recognizing who suffers from nighttime fears, "It is well known how intensely older children suffer from vague and undefined fears, as from the dark . . . " (Charles Darwin 1877[8]). Estimates from many published research studies since Darwin's time show how common nighttime fears are in children. The estimates vary depending on how the research was done and which questions the researchers were asking. Fear of the dark and nighttime fears can have several components and therefore estimates of the fears are better described by looking at the study results themselves rather than just giving an approximation, as follows:

73.3% of school children aged 4 to 12 reported nighttime fears (Muris 2001[9]).

Nighttime fear is common with a prevalence of 64.2% in children and adolescents (Gordon 2007[10]).

Between ages 5-8, 33% are specifically afraid of the dark (Cashman 1991[11]).

The literature notes that the peak of these fears occurs in 4-6 year/olds with a gradual reduction after that age (NSC/Harvard 2010[12]). However, in older children, the percentages are still rather high and some experts suggest they actually increase. Children ages 7-11 are in the concrete operational stage of development which allows for the understanding of "cause and effect" and may thus increase their fears. Recent evidence shows a surprisingly elevated percentage of college aged "children" who have fear of the dark. Here are some of the examples in older children:

The most frequently reported sleep problem in ages 6-11 children was fear of falling asleep in the dark (Hvolby 2008[13]).

Children age 7-13 showed fear of the dark was in their top ten list of fears (Muris 1997[14]).

In boys ages 6 to 8.5, up to 18.1% "often" expressed fear of the dark (Rosenberg 2012[15]).

Adolescents recall fear of the dark as being their most frequent fear when they were children (Sipes 1985[16]).

64% of children 8 to 16 years old, admit to nighttime anxieties or fears (Gordon 2007[17]).

(Muris et al 2001[18]) found that nighttime fears become even more frequent in 7 to 9 year olds and then remained relatively stable in 10 to 12 year olds.

A study of 100 college students who were good or poor sleepers found that 46% of the poor sleepers admitted to having current fears of darkness (Carney 2012[19]).

Fear of the dark most often does not appear until age 2 or after (Garber 1993[20]). A study from 1935 (Jersild 1935[21]) asked children age 2-5 to fetch a ball in a dark corridor and 45% of them would not go into the corridor without an adult. Overall, studies show that fear of the dark peaks at different ages for different children, but can clearly be present and frequent until late adolescence or early adulthood.

Thankfully for most children, nighttime fear is normal, mild and transient (Bauer 1976[22]; Ferrari 1986[23], NSC/Harvard 2010[24]). However there are three important caveats to this observation.

First, "normal" does not mean harmless, inconsequential or painless. Death is a normal part of development too. Pain is a normal part of childbirth. These normal things are not necessarily harmless, inconsequential or painless. Few if any studies have followed the natural progression of nighttime fear for longer than a few months, so "transient" might mean "many years", the duration is not known with certainty.

Second, persistent fear can actually have life-long consequences by disrupting the developing architecture of the brain (NSC/Harvard 2010[25]). The available data certainly seems to suggest that nighttime fears are persistent, although more research is clearly needed.

Lastly, studies have shown that parents are mostly unaware of the presence of their child's fear, let alone the degree or the amount of associated distress caused. In a study showing that 73.3% of the children reporting nighttime fears, only 34% of their parents were aware of it. The same has been found for other fear-related nighttime occurrences like nightmares. In a study of over 8000 parents and children the researchers found there was a significant underestimation of nightmare frequency in the parents' ratings compared to the children's data. (Schredl 2009[26]) It's not the parents fault. Very little has been done to educate parents about nighttime fears.

So nighttime fear is very common in children, may not be harmless or painless, and parents are largely unaware. The experts say that it is important to address childhood nighttime fears and to take the time to understand nighttime fears.

A paper entitled "Persistent Fear and Anxiety can Affect Young Children's Learning and Development" was written by the National Scientific Council on the Developing Child, thru Harvard University in 2010 (NSC/Harvard 2010[27]). The council consisted of eleven well-credentialed doctors and professors. They formed a multidisciplinary collaboration designed to bring the science of early childhood and early brain development to bear on public decision making, and they were committed to evidenced-based methodologies (in other words: proven or backed up by solid science).

The NSC/Harvard 2010 report says, "threatening circumstances that persistently elicit fear and anxiety predict significant risk for adverse long term outcomes from which children do not recover easily". The report goes on to note that persistent fear can have life-long consequences by disrupting the developing architecture of the brain. Also, children do not naturally outgrow early learned fear responses over time.

"During typical development, children learn to regulate their responses to mild threats and stresses. However, if young children are exposed to persistent fear and excessive threat during particularly sensitive periods in the developmental process, they may not develop healthy patterns of threat/stress regulation. When they occur, these disruptions do not naturally disappear."

Of course, the NSC/Harvard 2010 council is discussing a range of fears, anxiety and trauma that children experience, some of which can be very severe. Most nighttime fears may be on the mild end of the severity scale, but on the persistent scale they can be quite high and last for years.

There are additional science-backed reasons to consider addressing the nighttime fears of children:

Fear and worry have been linked to difficulties in daily functioning, social functioning, academic functioning, and low self-esteem, depression, and drug abuse (Zisenwine 2012[28]).

Children age 4-6 with night-time fears are at risk for developing poor sleep quality, those with nighttime fear had greater number of awakenings, shorter total amount of sleep and lower percentage of sleep (Kushnir 2011[29]). Many studies over the past 40 years have linked poor sleep to poor health, and even to poor school performance.

People who sleep with the light on will get less sleep and the sleep they do get is more fragmented and disturbed (Cho 2013[30]).

Children take 54 minutes longer to fall asleep if they are fearful than non-fearful (Mooney 1985[31]).

Darkness phobia causes significant discomfort and has negative effects on the child's daily life and that of his or her family. (Santacruz and Mendez 2006[32]).

Ten percent of children experience severe nighttime fear that seldom disappears spontaneously, impacts overall adjustment, affects the quality of family life and therefore requires intervention (Muris 2001[33]).

Children's nighttime fears cause significant interference with the child's functioning as well as causing much distress for the child and family (Gordon 2007[34]).

Persistent sleep problems in childhood may be an early risk indicator of anxiety in adulthood. (Gregory 2005[35]).

The significance of what it is like for a child to live with daily fear, no matter what the degree, is not easily measured. When adults try to think back to their own childhood memories, the memories are often inaccurate. It is well known that the human brain will distort or even block memories that are painful. The adult brain also has many more coping skills to deal with fear, for example it easily rationalizes that monsters don't exist.

There is a way, however, that adults can better appreciate the discomfort of childhood nighttime fears. They can think about an adult fear (death, illness, heights, public speaking, or other events) and then imagine that feeling of fear being obviously present every night while trying to fall asleep. Once this chronic discomfort is appreciated, it quickly raises the question about what can be done to help children allay nighttime fears.

Apparently, there is no one best approach. All children are different and fears often have multiple influences. Therefore fear treatment of any type may be more effective if it also has multiple features (NSC/Harvard 2010[36]; King 1997[37]).

Most approaches used by experts are successful and long lasting. There are three main steps to consider; awareness, relatively easy approaches, and more involved approaches.

Awareness is important because, as has been mentioned earlier, research has shown that most parents are not aware of their child's nighttime fear. Studies also show that accurate parental perception of the issue increases the chance of successful resolution of the problem (Silverman & Treffers, 2001[38]). Parental focusing on awareness is worthwhile.

Can the child go into a dark room by him/herself? How about that same dark room with an adult? Does the dark seem to affect the child's decisions? Does the child resist having the light turned out when going to bed? Does the child insist on having a night light? Since children are very good at hiding things, parents must ask these questions and look hard for clues.

Listening to, talking with and playing with children are great ways to increase awareness of nighttime fears. Parents should let children know that it is normal to have nighttime fears, and it is just part of growing up for most children. Parents can share with children their own experiences growing up and how they dealt with fear. Parents should consider playing one of the child's favorite games in a darkened (but safe) environment and see how they react. When the parent leaves the room for only a moment, do the children immediately follow?

Having a greater awareness will help guide a parents decisions about addressing a child's nighttime fears. Perhaps nothing needs to be done because the parent determines the night fear is mild and transient. On the other hand, parents may notice a child's continued discomfort or difficulty tolerating the dark and if so it is time to consider some relatively easy approaches to allaying nighttime fears. One or all of the easy approaches may be tried, but it is not wise to overwhelm the child, or the parents, with too many at once.

It comes as no surprise that one of the most effective of the easy approaches for allaying nighttime fears is to use an ordinary night light. The top three nighttime fears are imaginary (monsters), human/animal (intruders) and general fear of the dark. All of these fears can be helped by ambient light. However, ordinary night lights used to provide ambient light have several drawbacks. Sleeping with a night light creates a non-dark environment that tends to interfere with good sleep (Cho 2013[39]). Using an ordinary night light over a period of many nights essentially ignores the problem of night fear caused by darkness since the room is not dark. The hope is that night fear after many nights will eventually go away and the night light can be turned off. While often the night fear will go away, the length of time before the night fear goes away may be excessive or the night fear may not go away at all. Again, research shows that many college students are uncomfortable sleeping in the dark!

For another easy approach, experts recommend the use of a stuffed animal, doll or other toy in one of two ways. In the first way, the toy is given to the child and the child is told that the toy is a protector that will keep the child from danger in the dark. In the second way, the child is told the toy is afraid of the dark, of a monster or of another scary thing and the child should protect the toy from the scary thing. Both the first and second ways at times show significant improvements in overcoming sleep problems and in overcoming nighttime fear. These two ways of using a toy have been shown to be effective particularly for children ages 4-6; with maintenance of that reduction measured 6 months later (Kushnir 2012[40]).

An extension of the stuffed animal or other toy approach is to use both ways at once. Children can then put themselves in the position of being protected and of being a protector. This extension to both ways allows children to both express their fears ("I'm scared and feel protected by the toy") and also to use their coping skills ("Its ok, I am brave and I can protect the toy; and besides, there are no such thing as ghosts").

For another easy approach, playing games (play therapy) in a darkened environment can help parents assess a child's nighttime fear and can also be used to help reduce the fear itself. A game that lends itself to being played safely in the dark is used. The light is reduced each time the game is played with the child. The reduction in light is paused or made brighter if the child gets scared. This is a form of progressive desensitization (also called graded exposure) that is used in cognitive behavioral therapy (CBT), which is the most widely used clinical treatment for fears and phobias (Gordon 2007[41]; King 2005[42]).

Play therapy has been shown to help darkness phobia and nighttime fears (Santacruz 2006[43]). Although a parent may not be trained in this specialty area of therapy, parents do know how to play games with their children. While playing, the parent looks for opportunities to talk about the dark. "What does the child's toy think about being in the dark?" "Is Spiderman afraid of monsters?" "What could Barbie do if she was afraid of the dark?" Just the act of talking about darkness and engaging characters familiar to children helps children process their fears and get over them.

Separation fears can be part of nighttime fears. Being separated from the parent or caregiver is scary at certain times of a child's development. One approach is the use of a transitional object (Galligan 1994[44]) that the child can bring to bed like a blanket, toy or something else (tee-shirt, sweater, hat, or other items) that reminds the child of the parent.

Preschoolers are far less likely to be afraid of something if they are able to picture it in a playful and non-threatening way (Sayfan 2009[45]). The fantasy-reality confusion and active imaginations that contribute to nighttime fears can also be used to help children overcome their fears (Zisenwine 2013[46]). This technique is also very successfully used in clinical nightmare treatment and is called imagery rehearsal therapy (Casement 2012[47]). Basically, the story is changed to turn the fearful item into something non-threatening. For example, instead of getting chased and eaten by a monster, the story is change to "The monster is chasing you because Angry Birds is his favorite game and he wants to play Angry Birds with you!" The parent rehearses and presents the new version to the child. The parent helps the child to re-imagine it, "How cool would it be to have a monster as a friend?" The parent collaborates with the child to find a new story that resonates non-fearfully with the child.

Cognitive restructuring is a somewhat similar technique and describes the process of replacing mal-adaptive thinking with functional thinking (Chorpita 2007[48]). The parent helps the child to change the child's thoughts about the scary situation. For example, bravery statements such as "I am brave" and "I can take care of myself in the dark" have commonly been used in studies of nighttime fear (Graziano & Mooney 1980[49]; Kanfer and Karoly 1975[50]). Making those new statements something the child can really relate to and connect with will increase the helpful effects (King 2005[51]; Giebenhain 1984[52]).

Childhood nighttime fears can be linked to the child's environment. Negative information (80%), conditioning (25%) and modeling (13%) all contribute to the origins of nighttime fears (Muris 2001[53], and others). These results are why many professionals recommend looking at the child's environment (TV, movies, internet, activities, friends, or other things) for potential triggers and to try reducing those felt to be contributory to night fear. Non-fearful and age appropriate activities are the goal. Since each child is unique, a parent is often the best judge of appropriate activities.

Children who have daytime worries, about school, separation from parents or other concerns, are also more likely to fear the dark (Gregory 2005[54]). Parents need to be aware of all possibilities as causes for or contributors to nighttime fear.

Reading books with a child, or letting them read alone, has been shown in several studies to help reduce nighttime fears (Santacruz and Mendez 2006[55]; Mikulas & Coffman 1989[56]; Zisenwine 2013[57]). A parent's judgment is often the best guide for suitable books and reading. In younger children, any story with mild elements of darkness or creatures can help them talk out their fears. These children do better with positive pretense strategy, i.e. imagining the ghost as a "friendly" ghost. For older children, a more direct approach or reality affirmation can work better, i.e. reminding them what is real and not real.

More involved approaches, although more time consuming, complicated and mostly only available professionally, can be extremely helpful so it is worth understanding some basic points.

In Cognitive Behavioral Therapy (CBT), researchers reviewed 29 studies on nighttime fears that had been published in the scientific literature and found that most employed cognitive-behavioral techniques and that most of these studies showed a rapid reduction of nighttime fears. This reduction was typically achieved after only a few sessions with maintenance of gains upon follow-up testing (Gordon 2007[58]; Graziano & Mooney 1980 and 1982[59]). CBT is very commonly and successfully used to treat even severe fears, anxiety, and insomnia. It utilizes a number of techniques (desensitization, emotive imagery, token economy, cognitive self-instruction and restructuring as well as reinforcement procedures or other techniques). The best results come from working with a professional. Although CBT treatments are commonly delivered via written manuals for the patient to work on at home (Sadeh 2005[60]), professional help yields the best outcome. Therefore, often the best first step to access CBT treatment is for a parent to visit with a child's pediatrician.

Sleep Hygiene includes recommendations for developing good sleep habits that are based on 50 years of sleep science and physiology. Sleeping better leaves less time for fear (Ferber 1995[61]). Sleeping worse clearly raises the chance of poor school performance and behavioral problems. Children with fear on average take 54 minutes longer to fall asleep each night (Mooney 1985[62]). Common sleep hygiene recommendations include the following TABLE 1:

TABLE 1

Keep very close to the same bedtimes and wake up times every day.
Get sufficient amounts of sleep every day (recommended number of
    hours for nighttime sleep and for naps often depends on
    developmental age).
Avoid lots of time awake in bed (more time to worry about monsters!).
Follow a regular relaxing routine of activities 20-30 min before bedtime
    (winding down allows physical and psychological readiness to
    fall asleep more quickly) and if possible avoid bright lights
    (light before bedtime tends to awaken the brain).
Avoid caffeine after lunchtime and for the rest of the day.
Avoid a lot of stimulation (TV, internet, physical activities) in the
    30-60 min window before bedtime.
Put children to bed drowsy but still awake, so they learn to fall back to
    sleep in their own beds if wakened in the middle of the night.
Keep the bedroom as dark as is comfortable. A quiet and slightly cool
    bedroom is usually best for sleeping.
Encourage age appropriate physical exercise and diet - this helps with
sleep.
Keep a sleep log or sleep diary to track a child's sleep over time. This can
    take some effort but can also be very revealing and can help a doctor
    guide a child's treatment.

Additional sleep hygiene recommendations as well as information about how and why these are beneficial for sleep can be found at a sleep doctor's office. Just like with CBT, the doctor can provide important personalized details specific to a child's situation.

A great place to get help is at a child's pediatric doctor's office. This may include other appointments, or referrals, or even some testing, but the value returned for spending this time is usually very high. This step is especially important to take if the nighttime fear problem continues despite a parent's efforts, or if it is noticed that a child is developing impaired social, behavioral or school performance.

Nighttime fears are very common in children and although they are most often considered to be a normal part of childhood development that does not mean they are painless or harmless. Also, nighttime fears often last months or even years. Treatment can be successful but limited awareness of the problem and access to effective treatment is likely preventing children from getting this help.

It is well known in fear and phobia treatment that having control over the fear triggering stimulus will lessen the degree of fear. Avoiding the fear promoting stimulus altogether is one of the most common coping strategies employed by phobic persons to reduce their fear, and is a very simple and effective form of control. There is, therefore, a need for devices allowing a person to have immediate control over the light levels in a room (via remote control and in proximity to a controlled remote light) to give a person control over the fear trigging stimulus and thus to reduce the person's level of fear. There is a need to have devices that are able to adjust programming functions such as tapering and dimming to increase the beneficial effect of having control.

In consideration of the above background, there is a need for improved methods and apparatus useful in reducing or eliminating nighttime fears and their resulting discomfort in children.

SUMMARY

The present invention is a fear-reducing device including a light for providing illumination in a dark room occupied by a person and including a controller for controlling the light output levels of the light. The light has variable lumen output levels in response to light control signals from the controller for helping overcome night-fear of the person. The controller includes a control unit for providing the light control signals for the light to reduce the light output levels over time. The controller is portable for location in close proximity to the person whereby the person can control the light control signals. The control unit automatically reduces the output levels over a tapering period of time extending for multiple weeks. The control unit automatically reduces the output levels over a dimming period for each day of the tapering period. The controller is remote from the light and communicates with the light with wireless communication.

The fear-reducing device utilizes a form of progressive desensitization. The light output levels are progressively reduced over a period of nights. For initial nights, a high lumens output is provided. With such a high lumens output, the room is so light that night fear is avoided. For a first sequence of subsequent nights, a first reduced output level is provided. With a first reduced output level, the room is again bright enough so that night fear is avoided. Similarly, for additional sequences of nights, additional reduced output levels are progressively provided. The child progressively learns to accept lower and lower output levels without triggering significant night fear. Eventually, the light output level is low enough, or completely off, so as not to interfere with sound sleep. Progressive desensitization techniques like this are often used in Cognitive Behavior Therapy, which represents a professional standard treatment for fears and phobias.

The foregoing and other objects, features and advantages of the invention will be apparent from the following detailed description in conjunction with the drawings.

BRIEF DESCRIPTION OF THE DRAWINGS

FIG. 1 depicts a schematic representation of a fear-reducing device.

FIG. 2 depicts a schematic representation of another embodiment of a fear-reducing device.

FIG. 3 depicts a schematic representation of a remote light for use with the fear-reducing devices of FIG. 1 and FIG. 2.

FIG. 10 depicts another embodiment of a fear-reducing device.

DETAILED DESCRIPTION

Figure 4:
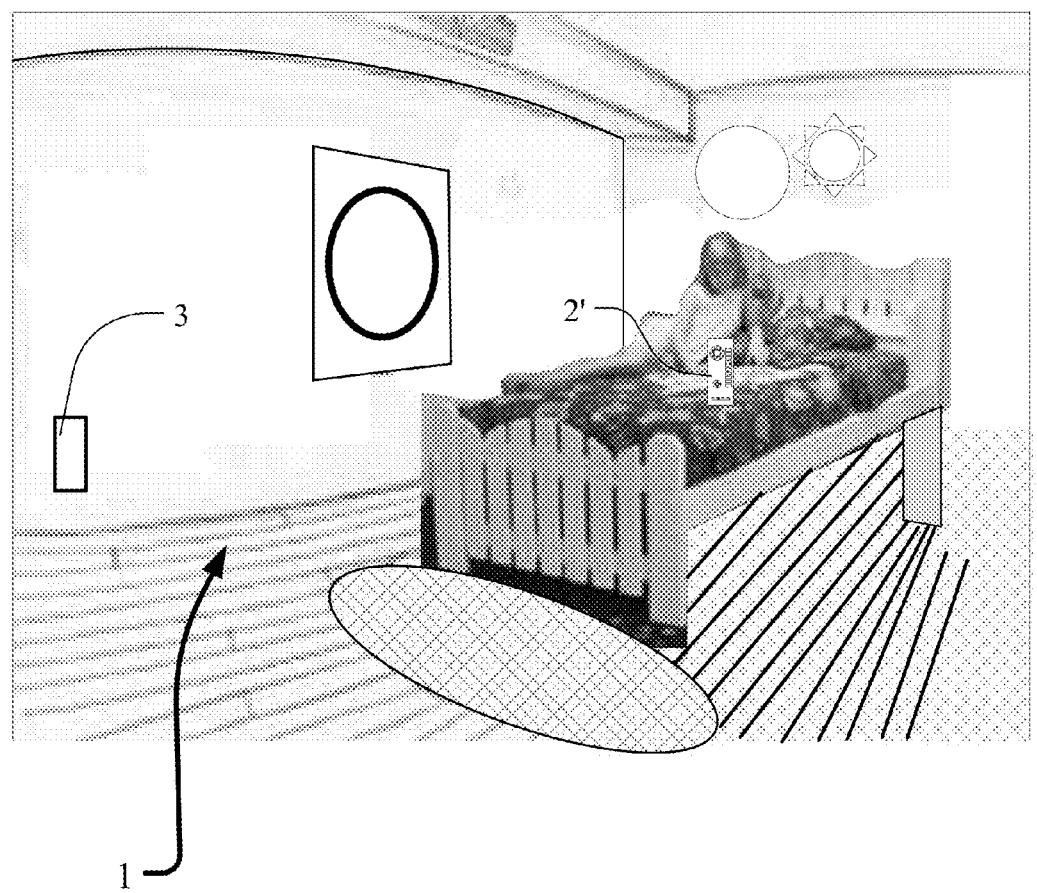
FIG. 4 depicts a child in bed with a handheld component of a fear-reducing device and with a remote light of the fear-reducing device across the room.

In FIG. 1, a schematic representation is shown of an embodiment of a fear-reducing device 1 including a controller 2 and a remote light 3. The controller 2 is typically a hand-held device which is portable for location in close proximity to a person whereby the person can control light control signals to the remote light 3. The controller 2 includes an input unit 6. The input unit 6 includes a BRIGHTER switch 31, a DARKER switch 4, a mode control switch 11 (AUTOMATIC or MANUAL), input data buttons 12, a night-dimming ON/OFF switch 15 and a power ON/OFF switch 16. A display 5 displays, among other things, a light level indication representing different light levels of the remote light 3. An internal unit 8 provides light control signals for controlling the light levels of the remote light 3. The internal unit 8 connects to all of the elements of the controller 2.

The input data buttons 12 include a START LIGHT LEVEL button 12-1, a TIME button 12-2 and an ENTER button 12-3. The display 5 displays, among other things, a light level indication representing different light levels of the remote light 3, for example, levels L-1, L-2, . . . , L-10. While ten different display levels are typical, the number of levels can be any number equal to two or more. In one embodiment, the display 5 is a liquid crystal display for displaying levels L-1, L-2, . . . , L-10 to indicate the current lumens output level of the remote light 3. The display 5 is available for displaying other information useful to the successful operation of device 1. The mode control switch 11 switches between two modes, MANUAL or AUTOMATIC. In FIG. 1, the mode control switch 11 is shown switched to the AUTOMATIC mode. The internal unit 8 is connected to the BRIGHTER switch 31, the DARKER switch 4, the display 5, the buttons 12-1, 12-2, 12-3, 15 and 16, and to the mode control switch 11 for controlling the progressive desensitization operation performed by the fear-reducing device 1. The controller 2 connects through a wired or wireless connection to the remote light 3 to provide light control signals. Typically, the communication from the controller 2 to the remote light 3 is wireless, for example, the communication is by a Bluetooth protocol. However, any wireless or wired communication can be employed between the controller 2 and the remote light 3.

In some embodiments, the controller 2 of FIG. 1 connects through a wired or wireless connection to a smart device 19 such as a computer, tablet or smart phone for data, programming or other exchanges between the fear-reducing device 1 and the smart device 19.

In some embodiments, the controller 2 includes local light 24 which can be turned ON or OFF to act as a "flashlight". The local light 24 can be actuated in one embodiment when the local light 24 includes a built in switch actuated by depressing on the surface of local light 24. Alternatively, the local light 24 can connect to and controlled by the internal unit 8.

In FIG. 2, a schematic representation of a controller 2' and a remote light 3 of another fear-reducing device 1 is shown. The controller 2' is typically a hand-held device which is portable for location in close proximity to a person whereby the person can control the light control signals to the remote light 3. The controller 2' includes a BRIGHTER switch 31, a DARKER switch 4, a light-level display 5', an optional local light 24, inputs 6, including a mode control 13, and an internal unit 8. The light-level display 5' displays ten different light levels in displays 5-1, 5-2, . . . , 5-10. While ten different display levels are shown as typical, the number of levels can be any number equal to two or more. In one embodiment, the displays 5-1, 5-2, . . . , 5-10 are individual LED's illuminated one or more at a time to indicate the current lumens output level of the remote light 3. The mode control 13 allows four different modes of operation, namely modes A, B, C and D. The number of modes shown is equal to four and is typical, but the number of modes can be one or more. The mode control 13 is switchable to any one of the positions A, B, C or D. In FIG. 2, by way of example, the mode control switch 13 is shown switched to the B mode. The internal unit 8 is connected to the BRIGHTER switch 31, the DARKER switch 4, the light-level display 5 and the mode control 13 for controlling the progressive desensitization operation performed by the a fear-reducing device 1. In FIG. 2, the alternate controller 2' has similar functional features as described for controller 2 in FIG. 1. Modes A, B, C and D in FIG. 2 are pre-programmed instances of and variations of the automatic and manual functions described above. Any ones of the functions and sequences thereof are linked to any of the modes (A, B, C or D) as desired.

In some embodiments, the controller 2' of FIG. 2 connects through a wired or wireless connection to a smart device 19 (see FIG. 1) such as a computer, tablet or smart phone for data, programming or other exchanges between the fear-reducing device 1 and the smart device 19.

In FIG. 2, the remote light 3 includes a light 7 and an internal unit 9. The controller 2' and the remote light 3 are in communication with each other. Specifically, the internal unit 9 of remote light 3 is in communication with the internal unit 8 of the controller 2'. The internal unit 9 responds to the internal unit 8 to provide different levels of output light for light 7 under control of the controller 2' for controlling the progressive desensitization operation performed by the a fear-reducing device 1. Typically, the communication from the controller 2' to the remote light 3 is wireless, for example, the communication is by a Bluetooth protocol. However, any wireless or wired communication can be employed between the controller 2' and the remote light 3.

In FIG. 3, a schematic representation of a remote light 3 for use with the controller 2 of FIG. 1 and the controller 2' of FIG. 2 to form a fear-reducing device 1 is shown. The remote light 3 includes a light 7 which is typically an LED device. Typically, the bulb for light 7 is a bulb which avoids the blue and/or green wavelengths of light as these spectrums have been shown to effect sleep and circadian rhythms in adverse ways contrary to the desired results of this device.

The remote light 3 includes an internal unit 9. The internal unit 9 responds to the internal unit 8 of FIG. 1 and FIG. 2 to provide different levels of output light for light 7 under control of the controller 2 and controller 2' for controlling the progressive desensitization operation performed by the fear-reducing device 1. The internal unit 9 includes an RX receiving unit 9-1 which receives communications from the internal unit 8 of the controller 2 or the controller 2'. The internal unit 9 includes a PR power unit 9-2 for supplying different levels of power to the light 7 under control of the RX receiving unit 9-1 which, in turn, is controlled by the internal unit 8 of the controller 2 or the controller 2'. The power unit 9-2 receives power from a conventional AC power plug, such as a 110 volt power main (not shown) or alternatively from a battery (not shown). The internal unit 9 includes a LM DET unit 9-3 for detecting the ambient light level. The LM DET unit 9-3 is a light lumens detector that in one preferred embodiment operates when the light 7 is OFF. The remote light 3 is under control of the controller 2' and in one embodiment, the controller 2' periodically turns the light 7 OFF to enable a measurement by the detector unit 9-3. The OFF period is typically very short since the response time of the detector unit 9-3 is very fast. The OFF time is typically so short that it is not observed by persons in the room. The LM DET unit 9-3 in another embodiment operates when the light 7 is ON to provide a measurement of the light level in the room when the light 7 is ON.

In FIG. 4, a child in bed is shown with a handheld controller 2' of a fear-reducing device 1 and with a remote light 3 of the fear-reducing device 1 across the room and plugged into a 110 volt wall receptacle (not shown).

Figure 5:
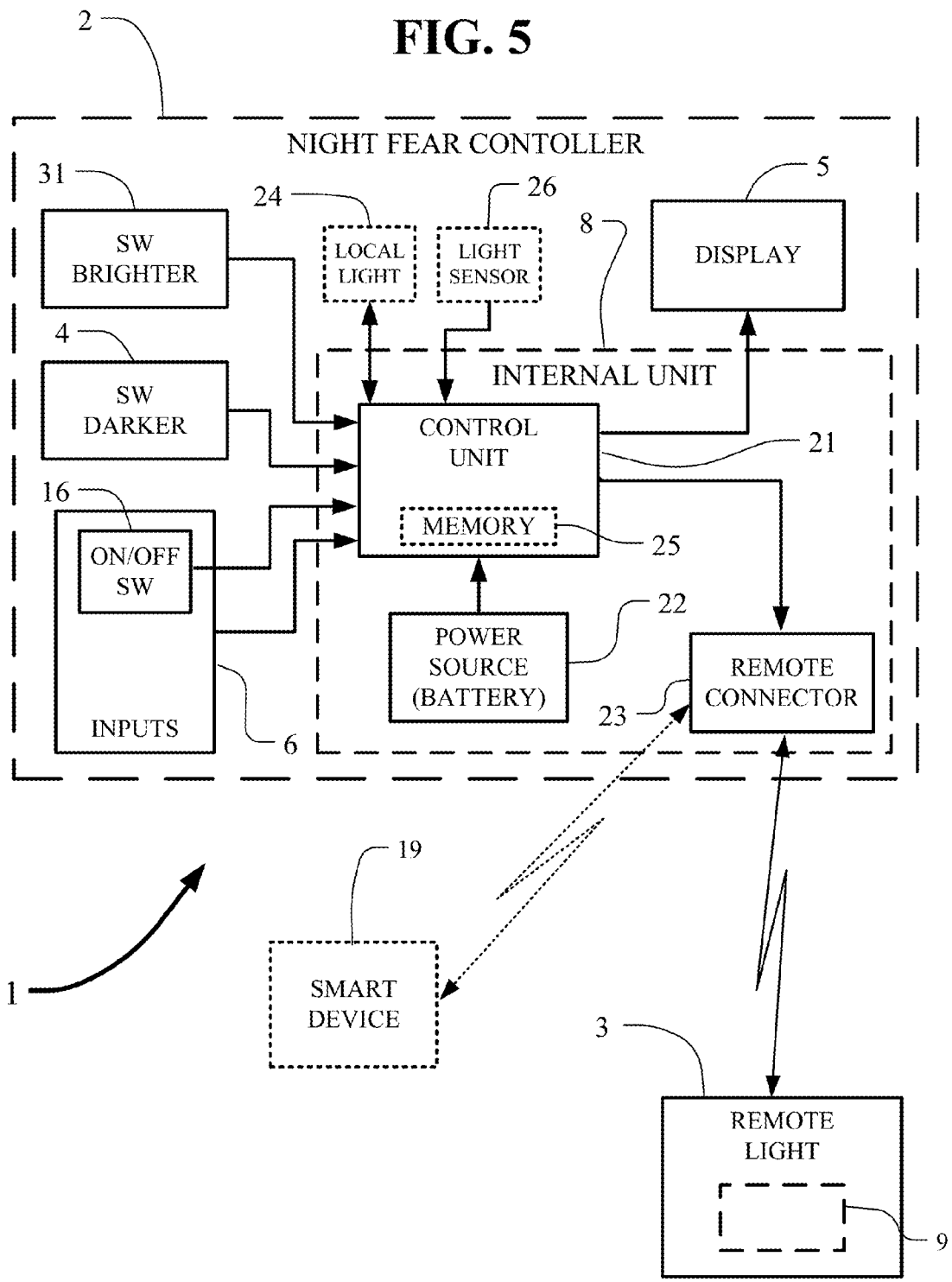
FIG. 5 depicts a block diagram representation of the electrical components of one embodiment of the fear-reducing device.

In FIG. 5, a block diagram representation of the electrical components of the fear-reducing device 1 of FIG. 1 is shown. The controller 2 includes a BRIGHTER switch 31, a DARKER switch 4, ON/OFF switch 16, inputs 6 and a display 5 all connected with inputs to or outputs from an internal unit 8. The light-level display 5 displays, for example, ten different light levels. While ten different display levels are typical, the number of levels can be any number equal to two or more.

The internal unit 8 includes a control unit 21, a power source 22 (typically a battery) and a remote connector 23. The control unit 21 is connected to receive inputs from the BRIGHTER switch 31, the DARKER switch 4, and the inputs 6. The control unit 21 provides outputs to the display 5 and the remote connector 23. The remote connector 23 connects to the remote light 3 with a wired or wireless connection. The control unit 21 operates, based upon the inputs from the BRIGHTER switch 31, the DARKER switch 4, and the inputs 6 when the ON/OFF switch 16 is ON to control the progressive desensitization operation of the fear-reducing device 1. The controlling is done by light control signals generated by the control unit 21 and provided through remote connector 23 to the remote light 3.

In FIG. 5, the remote connector 3 in some embodiments connects to a smart device 19 such as a computer, tablet or smart phone for data, programming or other exchanges between the fear-reducing device 1 and the smart device 19. This night fear reducing device is designed to be easy to use. It can also be adjusted to suit individual preferences.

Figure 6:
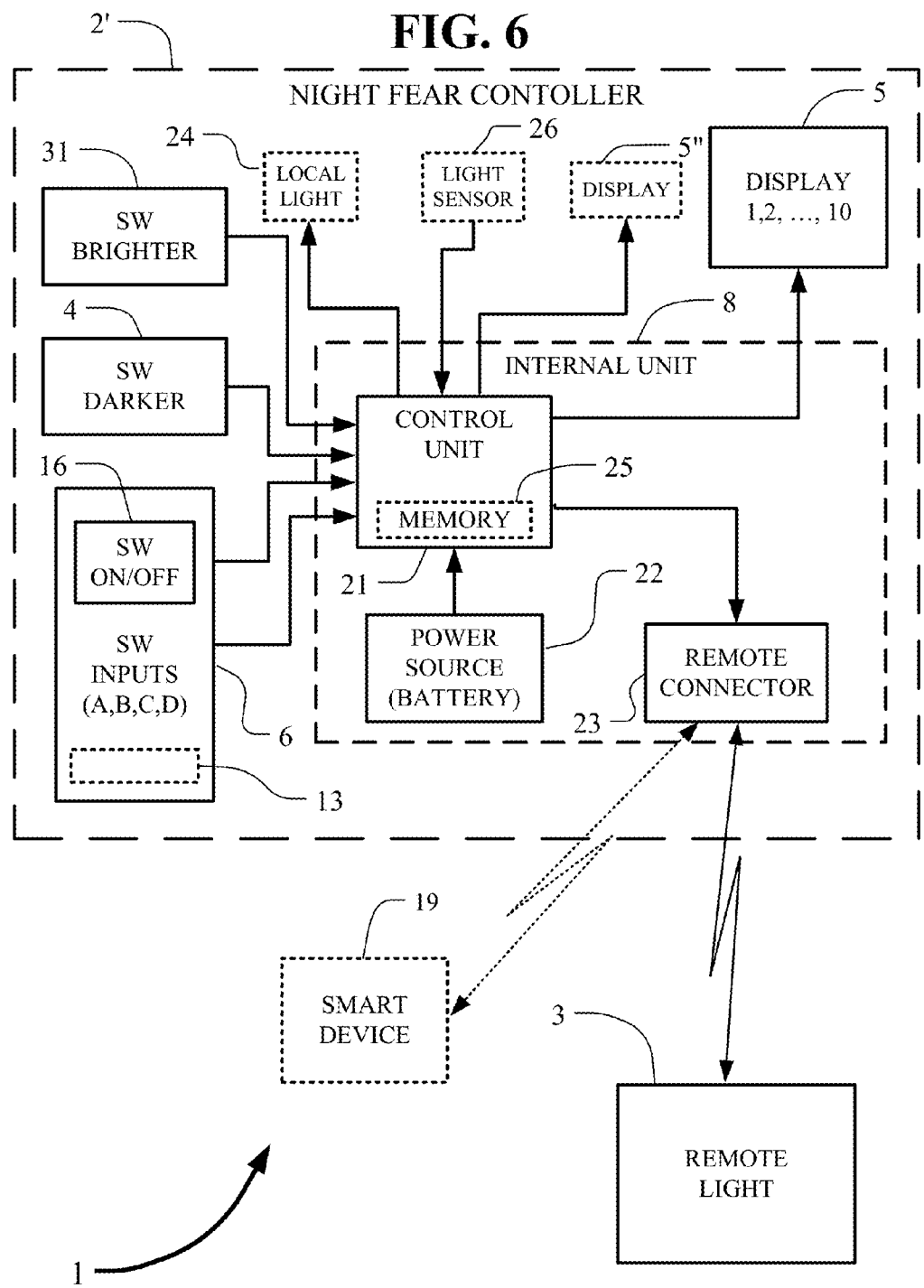
FIG. 6 depicts a block diagram representation of the electrical components of another embodiment a fear-reducing device.

In FIG. 6, a block diagram representation of the electrical components of the fear-reducing device 1 of FIG. 2 is shown. The controller 2' includes a BRIGHTER switch 31, a DARKER switch 4, ON/OFF switch 16, inputs 6 including mode control 13, a local light 24, a display 5' and a display 5" all connected with inputs to or outputs from an internal unit 8. The display 5' displays, for example, ten different light levels. In one embodiment, the display 5' includes ten individual LED's (see FIG. 2) illuminated one or more at a time to indicate the current lumens output level of the remote light 3. While ten different display levels are typical, the number of levels can be any number equal to two or more. A display 5" when optionally included in FIG. 2 is typically a liquid crystal display for displaying other information useful to the successful operation of device 1.

The internal unit 8 includes a control unit 21, a power source 22 (typically a battery) and a remote connector 23. The control unit 21 is connected to receive inputs from the BRIGHTER switch 3, the DARKER switch 4, and the inputs 6. The control unit 21 provides outputs to the display 5 and the remote connector 23. The remote connector 23 connects to the remote light 3 with a wired or wireless connection. The control unit 21 operates, based upon the inputs from the BRIGHTER switch 31, the DARKER switch 4, and the mode control 13 when the ON/OFF switch 16 is ON to control the progressive desensitization operation of the fear-reducing device 1. The controlling is done by light control signals generated by the control unit 21 and provided through remote connector 23 to the remote light 3.

In FIG. 6, the remote connector 23 in some embodiments connects to a smart device 19 such as a computer, tablet or smart phone for data, programming or other exchanges between the fear-reducing device 1 and the smart device 19. This night fear reducing device is designed to be easy to use. It can also be adjusted to suit individual preferences.

In FIG. 6, the memory 25 of control unit 21, in some embodiments, maintains a history of operation including a record of the lumen output levels commanded by the control unit 21 over time including the tapering and dimming levels by date and time.

In FIG. 6, the device 1 has a light sensor 26 to record actual lumen levels in the room. The light sensor 26 provides the light level reading to the control unit 21.

In FIG. 6, the memory and/or sensor data are collected and stored in a way that the data can be collected manually (using a visual readout such as display 5 of FIG. 1 OR DISPLAY 5" of FIG. 2) or uploaded to a computer such as smart device 19 in FIG. 5 or FIG. 6.

In FIG. 1 and FIG. 2, the device 1 has a manual ON/OFF switch 16. In some embodiments the ON/OFF function is performed automatically based upon time, light or other programmed variables under control of the control unit 21.

Figure 7:
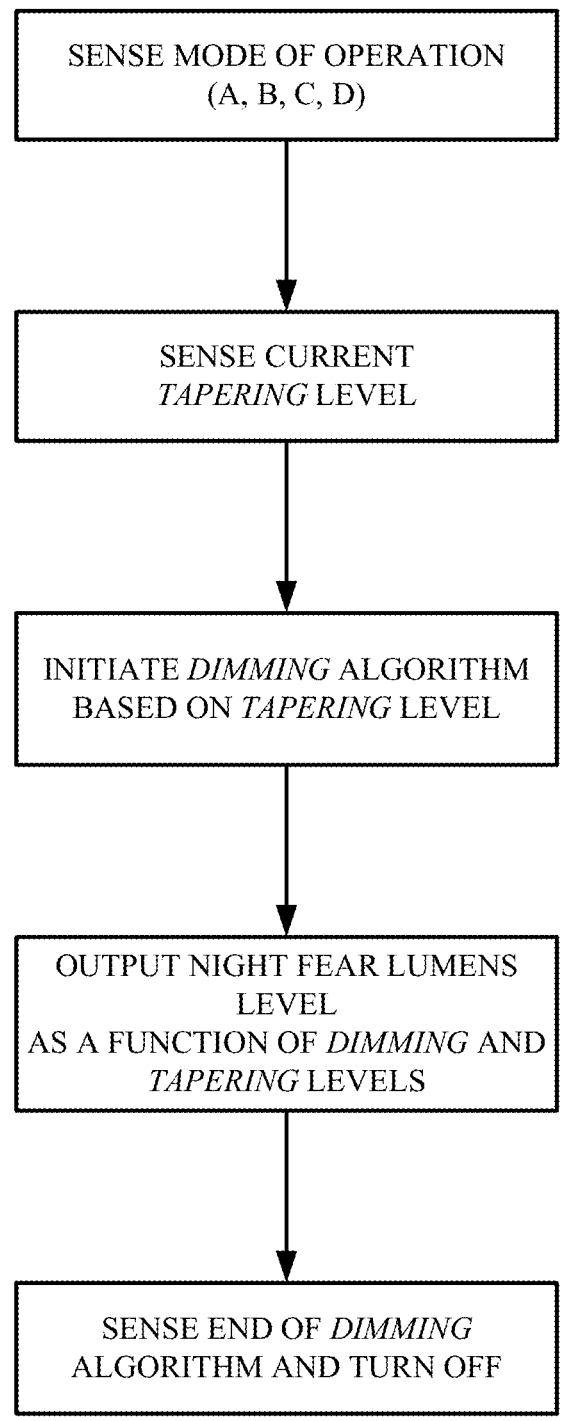
FIG. 7 depicts a typical flow diagram of the operation of one embodiment a fear-reducing device.

In FIG. 7, a flow diagram is shown of one sequence of operations in one mode, Mode B, of the fear-reducing device 1 of FIG. 2 and FIG. 6. In FIG. 2, when the device 1 of FIG. 2 is turned ON by operation of the ON/OFF switch 16 or by automatic means, the SENSE MODE OF OPERATION function senses that Mode B is selected because the mode control switch 13 is switched to Mode B. With Mode B selected, the NIGHT DIMMING function is automatically entered. The internal status for Mode B operation is detected, from internal memory 25 in control unit 21, and causes the SENSE CURRENT TAPERING LEVEL function of FIG. 6. As a result of that function, the control unit 21 goes to the INITIATE DIMMING ALGORITHM BASED ON TAPERING LEVEL. The control unit 21 then goes to the OUTPUT NIGHT FEAR LUMENS LEVEL AS A FUNCTION OF THE DIMMING AND TAPERING LEVELS. The control unit 21 continues to control the lumens level to the light 3 over the DIMMING period. The control unit 21 sends a LUMENS FEAR LEVEL indication to the display 5, sends a remote output light level signals to the remote connector 23 which in turn connects the signal to remote light 3 to set the current output light level of light 7. The control unit 21 maintains the status quo for a long period, for example a 12 hour dimming cycle unless an OFF, DARKER or BRIGHTER input is detected. If an OFF, DARKER or BRIGHTER input is detected the control unit 21 moves to the turn OFF, decrease output level or increase output level, respectively. When the control unit 21, senses the end of the dimming cycle, the SENSE END OF DIMMING ALGORITHM AND TURN OFF function turns OFF the device 1.

As indicated in FIG. 7, there are two key functions performed by the fear-reducing device 1 of FIG. 1 and FIG. 2, namely, the device 1 gradually reduces ambient light, in a particular pattern, over a period of weeks or months in a reduction called "tapering" and device 1 gradually reduces ambient light during each night in a reduction called "dimming". Tapering patterns are designed to gradually reduce the level of ambient light from one day or week or month to the next, in a fashion consistent with progressive desensitization and cognitive behavioral therapy (CBT), while also optimizing sleep. Several representative "tapering" patterns are shown in FIG. 8.

Figure 8:
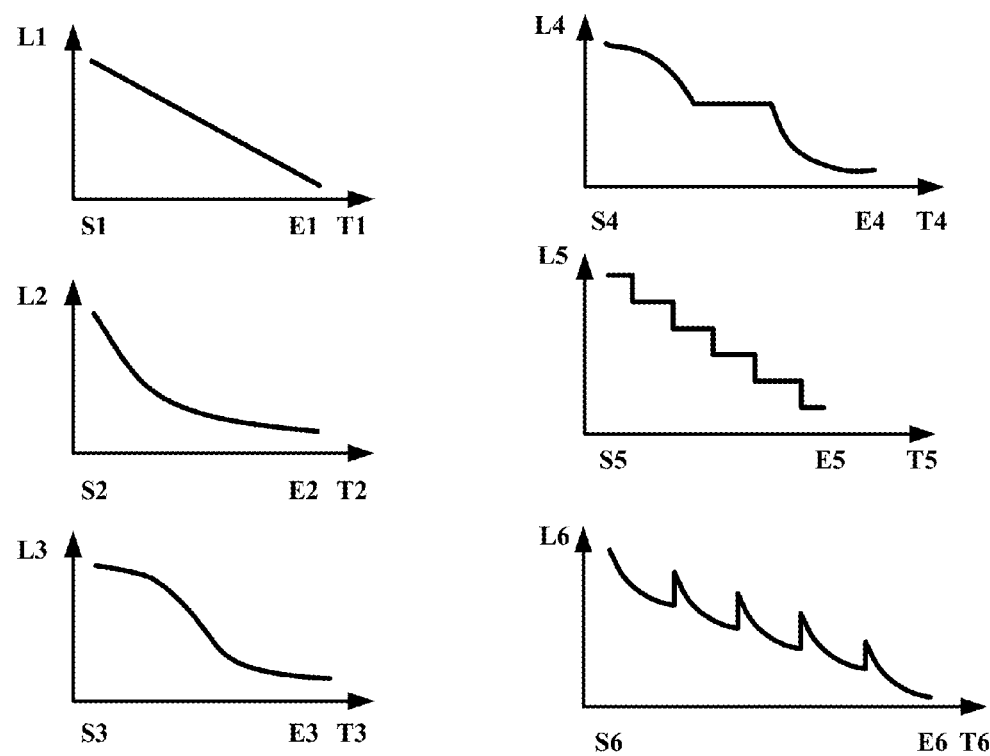
FIG. 8 depicts graphic representations of the reduction of light over tapering periods of fear-reducing devices.

In FIG. 8, six different tapering patterns are shown. The tapering patterns have lumens outputs L1, L2, L3, L4, L5 and L6 over times T1, T2, T3, T4, T5 and T6, respectively. The L1 pattern has a start date S1 and an end date E1 with a linear reduction each day over the T1 time between S1 and E1. The T1 time is typically measured in weeks and typically extends over several months. The start date S1 is the first turn ON date and the E1 date is the end time, in one example, 46 weeks after E1. In a similar manner, each of the lumens outputs L2, L3, L4, L5 and L6 has an initial turn ON date S2, S3, S4, S5 and S6 and a corresponding turn OFF date E2, E3, E4, E5 and E6, respectively. While the reduction in lumens output each day for L1 is linear, the reductions in lumens outputs for L2, L3, L4, L5 and L6 are non-linear as shown by the curves of FIG. 8. The curves of FIG. 8 are representative examples and not intended to be exhaustive since the number of curves representing the lumens output reduction over time is practically limitless.

Figure 9:
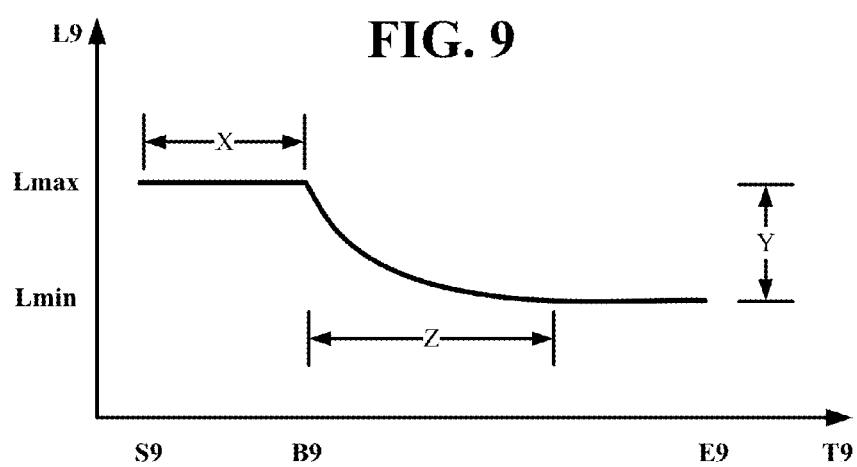
FIG. 9 depicts graphic representations of the reduction of light over a dimming period of a fear-reducing device.

In FIG. 9, a dimming pattern is shown. The dimming pattern has lumens outputs L9 that varies over time T9. The time T9 is typically a portion of one day, that is, usually the night sleeping time during one day. Typically, the night sleeping time is less than 12 hours. Accordingly, the start time of the dimming period might, in one example, be turned ON at 8 pm one evening and then be turned OFF at 8 am the following morning.

Dimming patterns such as shown in FIG. 9 are designed to gradually reduce the level of ambient light during each night. Beginning at S9 and during some initial time period 'X' at the initial light intensity, Lmax, the light beginning at B9 is then automatically dimmed 'Y' percent, over 'Z' time period; where 'X' is generally not greater or less than that which would worsen sleep (e.g. anxiety about falling asleep before the light reduces or other considerations), 'Y' is generally not greater or less than would worsen sleep (e.g. encourage the development of an adverse sleep onset association disorder or other considerations) and 'Z' is generally not greater or less than would worsen sleep (for example, from noticing a sudden change in light intensity or other considerations).

By way of example, one way to use the device 1 is with controller 2 in FIG. 1 with switch 11 set to the AUTOMATIC mode. On the first night of use, device 1 is turned ON by the ON/OFF switch 11. In the automatic mode, the enter button 12-3 is depressed for 20 seconds. The device 1 then automatically follows a pre-programmed pattern of tapering, typically over a period of 3-6 months, with dimming occurring each night of activation. The device is turned OFF each morning manually using the ON/OFF switch 16 or by automatic operation of device 1. Each night after the first night, the device is again ON at bedtime. The device 1 again starts dimming proceeding on the same tapering and dimming sequences following the previous night's use.

There are many variations of sleep patterns and nighttime fears and therefore controller 2 in FIG. 1 has additional features of operation to suit individual needs and preferences for a personalized experience. The control unit 2 of FIG. 5 or the control unit 2' of FIG. 6 operate to receive individualized information from a smart device 19 for a particular person, and provide feedback to the particular person. Some of the individualized information and additional features are described as follows.

In AUTOMATIC mode as set by switch 11, the START LIGHT LEVEL button 12-1 allows the user to select a different light level at the beginning of the dimming process, and also at any time during the dimming process, based on personal preference, fear level or other considerations.

In AUTOMATIC mode as set by switch 11, the TIME button 12-2 allows the user to select a different duration of the fear reducing process, and can also change this duration at any time, to speed up or slow down the process based on personal preference, fear level or other consideration. For example, the TIME button 12-2 in combination with display 5 can be used to control the tapering duration from one month to three months thereby automatically adjusting the diming levels for each night over the tapering duration. Similarly, the TIME button 12-2 in combination with display 2(5?) can be used to control the dimming levels for any particular night.

In MANUAL mode as set by switch 11, the user has complete control and can manually select the desired light level using BRIGHTER button 3 or DARKER button 4, at any time in the fear reducing process.

In either AUTOMATIC or MANUAL mode as set by switch 11, the user can increase or decrease lumen levels (for bathroom break, fear or other considerations) by using the BRIGHTER button 31 or DARKER button 4, at any time.

In either AUTOMATIC or MANUAL mode, the NIGHT DIMMING button 15 can be used to turn the dimming function ON or OFF. Regardless of the settings determined for the output of remote light 3, the local light 24 (see FIG. 2) when available can be turned ON or OFF to act as a "flashlight".

In AUTOMATIC mode, anytime a brighter lumen level is selected and a period of time passes without further input, then the light level is gradually returned to levels determined by the settings in the AUTOMATIC mode operation.

In AUTOMATIC mode, and for maximum personalization, all variables (light intensity levels, tapering strategy, dimming strategy or other considerations) can be pre-programmed or constructed in real time or off line by a computer such as smart device 19 and this computer is usually external to the device 1 but may be part of the device and included in the internal unit 8.

Typical sequences of operation are described in the following TABLE 2, TABLE 3 and TABLE 4

TABLE 2

Simplest use of controller 2 FIG. 1:

1. First night of use: turn ON device 1 at bedtime, switch 16
2. Select AUTOMATIC mode, switch 11
3. Press enter for 20 seconds, switch 12-2
4. Each night thereafter, turn ON device at bedtime, switch 16

TABLE 3

More personalized use of controller 2' FIG. 2:

1. First night of use: turn ON device 1 at bedtime, switch 16
2. Select AUTOMATIC mode, switch 11
3. Select preferred bedtime light level (START LIGHT LEVEL button, 12-1)
4. Enter, switch 12-3
5. Select preferred time to reach the point where no additional light is provided by the night fear reducing device (TIME switch, 12-2)
6. Enter, switch 12-3
7. Select NIGHT DIMMING ON or OFF preference, switch 15
8. Each night thereafter, turn ON device at bedtime, switch 16

TABLE 4

Using MANUAL mode, either controller 2 of FIG. 1 or 2' of FIG. 2:

1. Turn on device at bedtime, switch 16
2. Select BRIGHTER button 2 or DARKER button 4 to choose preferred light level based on individual night fear and written guidelines about decreasing light levels over time
3. Change light levels at any time, Select BRIGHTER button 2 or DARKER button 4
4. Repeat each night While the invention has been described in connection with the embodiments of FIG. 1, FIG. 2, FIG. 5, and FIG. 6, any of the components and functions described in connection therewith can be interchanged with each other or added in addition therewith.

In FIG. 10, another embodiment of a fear reducing device 1 is shown. The device 1 includes a smart device 40 and a remote light 3. The device 40 is a smart phone, a pad or other smart device of the type using an Apple operating system, an Android operating system or other control software for controlling the execution of Application Programs and other programs.

The smart device 40 in a typical configuration includes sensors 41, memory 42, security 43, baseband communications 44, power 45, application processor 46, display 47, audio 48, touch screen 49 and connectivity 50. The sensors 41 typically include ambient light sensors and GPS sensors. The memory 42 typically includes flash card, mobile DRAM, MCP, eMMC and other conventional memory. The security 43 typically includes SMIC and NFC security solutions. The baseband communications 44 typically includes transmitters and receivers for cellular and other communications. The power 45 typically includes batteries and other power sources. The application processor is a central processor for executing all the processing requirements of the smart device 1. The display 47 provides display information for the smart device 40. The audio 48 provides for audio output and input for operations of the smart device 40. The touch screen 49 alone or in combination with the display 47 receives inputs from persons for operations of the smart device 40. The connectivity 50 provides local communication such as WiFi, Bluetooth, NFC and others.

The remote light 3 includes an internal unit 9. The internal unit 9 responds to the internal unit 8 of FIG. 1 and FIG. 2 to provide different levels of output light for light 7 under control of the controller 2 and controller 2' for controlling the progressive desensitization operation performed by the fear-reducing device 1. The internal unit 9 includes an RX receiving unit 9-1 which receives communications from the internal unit 8 of the controller 2 or the controller 2'. The internal unit 9 includes a PR power unit 9-2 for supplying different levels of power to the light 7 under control of the RX receiving unit 9-1 which, in turn, is controlled by the internal unit 8 of the controller 2 or the controller 2'. The power unit 9-2 receives power from a conventional AC power plug, such as a 110 volt power main (not shown) or alternatively from a battery (not shown). The application processor 46 potentially processes, among other things, thousands of APPs available from Apple, Samsung and others. In particular, one or more of the APPs works to control the remote light 3 to provide in combination a fear reducing device. The display 47 provides display information for the fear reducing functions as well as for other functions of the smart device 40. The audio 48 provides for audio output and input for operations of the smart device 40 in fear reducing and other modes. The touch screen 49 alone or in combination with the display 47 receives inputs from persons for operations of the smart device 40 in fear reducing and other modes. The connectivity 50 provides local communication such as WiFi, Bluetooth, NFC and others. Typically, connectivity 50 communicates with the receive and transmit unit 9-1 of remote light 3.

The operation of the night fear device of FIG. 10 is analogous to the operation of the night fear device of FIG. 1. In FIG. 10, the functions of the inputs and switches 6 and the BRIGHTER switch 31 and the DARKER switch 4 are implemented by the touch screen 49 when a fear reducing APP is executing in the processor 46. The display 5 of FIG. 1 is implemented by display 47. Communications between the smart device 40 and the TX/RX unit 9-1 of remote light 3 is through connectivity 50, typically using a Bluetooth protocol.

While the invention has been particularly shown and described with reference to preferred embodiments thereof it will be understood by those skilled in the art that various changes in form and details may be made therein without departing from the scope of the invention.

The invention claimed is:

1. A fear-reducing device comprising,
a light for providing illumination in a dark room occupied by a person, the light having variable lumen output levels in response to light control signals for helping overcome night-fear of the person,
a controller for controlling the light output levels wherein,
the controller includes a control unit for providing the light control signals for the light to reduce the light output levels over time,
the controller is portable for location in close proximity to the person whereby the person controls the light control signals.

2. The device of claim 1 wherein the control unit automatically reduces the output levels over a tapering period of time extending for multiple days or weeks.

3. The device of claim 1 wherein the control unit automatically reduces the output levels over a dimming period for each day of the tapering period.

4. The device of claim 1 wherein the controller includes a memory for tracking the output levels.

5. The device of claim 1 wherein the controller includes a display for displaying an indication of the output level, function of, or other feedback output from the device.

6. The device of claim 1 wherein the display operates to display operational information about the fear reducing device.

7. The device of claim 1 wherein the controller includes a BRIGHTER control permitting the person to adjust the output level brighter and includes a DARKER control permitting the person to adjust the output level darker.

8. The device of claim 1 wherein the controller is remote from the light.

9. The device of claim 8 wherein the light includes a receiving unit for receiving light control signals from the controller and includes a power unit for supplying different levels of power to the light under control of the light control signals.

10. The device of claim 1 wherein the controller communicates with the light using wireless communications.

11. The device of claim 1 wherein the controller communicates with the light using wired communications.

12. The device of claim 1 wherein the controller includes a light sensor for sensing the light levels in the room and the control unit includes a memory for storing the light levels over time.

13. The device of claim 1 wherein the controller includes a MANUAL/AUTOMATIC switch for switching to automatic and manual modes.

14. The device of claim 1 wherein the controller includes a night dimming ON/OFF switch for switching the night dimming function ON and OFF.

15. The device of claim 1 wherein the controller includes a mode switch for switching between a plurality of automatic modes.

16. The device of claim 1 wherein the controller includes an internal unit including the control unit, a battery power source and a remote connector.

17. The device of claim 16 wherein the remote connector connects the light control signals to the light.

18. The device of claim 16 wherein the remote connector connects to a smart device for uploading program and control information to the control unit and for downloading data from the control unit.

19. The device of claim 14 wherein the control unit operates to receive individualized information from a smart device for a particular person, and provide feedback to the particular person.

20. A fear-reducing device comprising, a light for providing illumination in a dark room occupied by a person, the light having variable lumen output levels in response to light control signals for helping overcome night-fear of the person, a controller for controlling the light output levels wherein, the controller includes a control unit for providing the light control signals for the light to reduce the light output levels over time, and wherein, the control unit automatically reduces the output levels over a tapering period of time extending for multiple days or weeks, the control unit automatically reduces the output levels over a dimming period for each day of the tapering period, the controller is remote from the light and communicates with the light with wireless communication.

* * * * *